United States Patent [19]

Roling

[11] 4,378,576
[45] Mar. 29, 1983

[54] REMOVABLE DISC MEDIA

[75] Inventor: William J. Roling, Richfield, Minn.

[73] Assignee: Magnetic Peripherals Inc., Minneapolis, Minn.

[21] Appl. No.: 163,539

[22] Filed: Jun. 27, 1980

[51] Int. Cl.³ .......................... G11B 5/82; G11B 25/04
[52] U.S. Cl. ....................................... 360/137; 360/97
[58] Field of Search ................... 360/97, 99, 137, 133, 360/135, 86; 346/137; 358/128

[56] References Cited

U.S. PATENT DOCUMENTS

| | | | |
|---|---|---|---|
| 3,691,542 | 9/1972 | Gabor | 360/97 |
| 3,706,085 | 12/1972 | Mowrey et al. | 360/97 |
| 3,980,308 | 9/1976 | Camerik | 360/86 X |
| 4,106,066 | 8/1978 | Kudo | 360/133 |
| 4,224,648 | 9/1980 | Roling | 360/97 |
| 4,232,870 | 11/1980 | Iemenschot | 360/97 X |

*Primary Examiner*—John H. Wolff
*Attorney, Agent, or Firm*—Frederick W. Niebuhr; Joseph A. Genovese

[57] ABSTRACT

An apparatus is disclosed for mounting a magnetic disc on a rotatable spindle. The apparatus includes a molded plastic disc-carrying hub having a circumferential collar, a central housing supporting a centering element, and a diaphragm joining the collar and housing, stiff in the radial direction but allowing axial movement of the centering element with respect to the collar. The collar includes three bosses to which a magnetizable armature plate is attached, with sufficient clearance between the plate and each boss to permit armature plate movement radially on the hub. The armature is attracted to a rotatable spindle by an annular permanent magnet mounted on the spindle. A cup formed in the spindle at its center receives the centering element and guides it to the center of the spindle, thereby centering the hub on the spindle independently of the armature as the armature is attracted to the spindle. After the centering element is seated in the center of the cup, the diaphragm flexes to allow continued axial movement of the armature to full engagement with the spindle.

5 Claims, 7 Drawing Figures

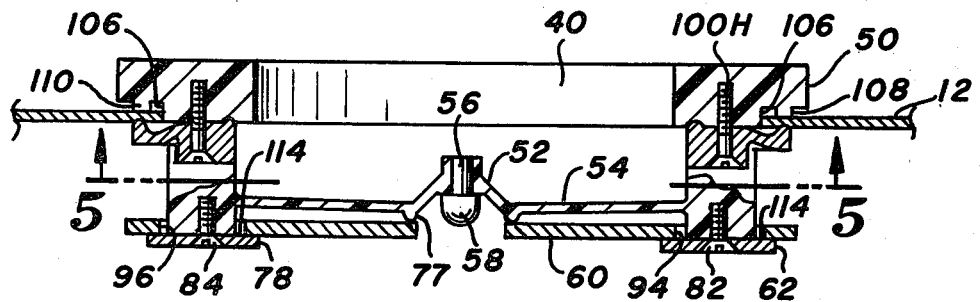
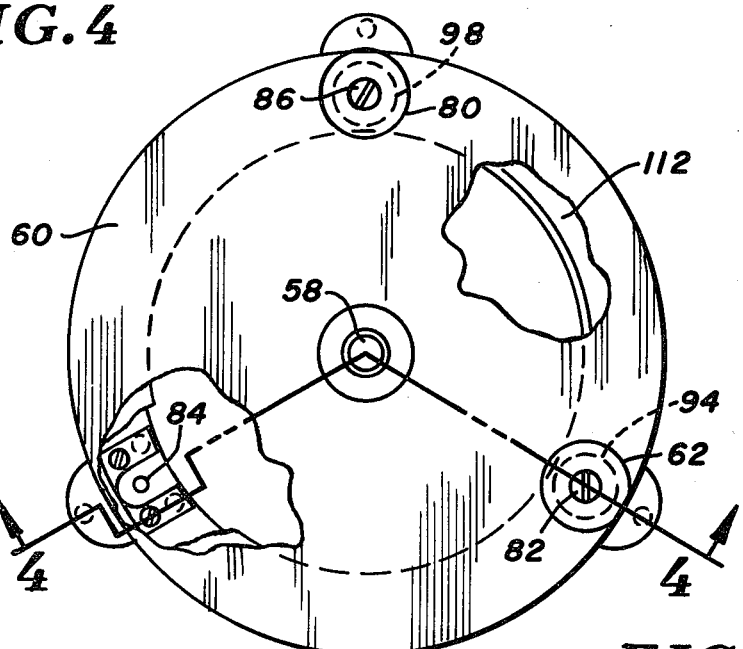
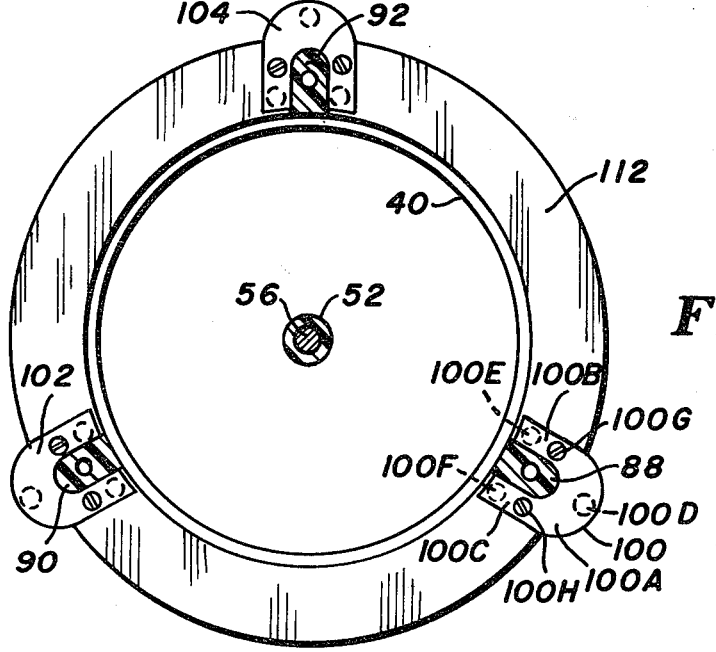

REMOVABLE DISC MEDIA

BACKGROUND OF THE INVENTION

This invention relates to memory devices including magnetic discs. A flat and circular disc coated with a magnetic recording material is a well known type of a memory device in the computing arts. In the case of a single disc mounted on a hub, it is often desirable to have interchangeability of a number of disc-hub assemblies on a given drive spindle. To insure convienience in changing discs, a permanent magnet mounted on the spindle is used to attract an armature plate mounted to the hub carrying the disc. Attraction between the magnet and armature plate maintains the hub against the spindle.

Due to the minute spacing between adjacent data tracks on the disc recording surface, extremely accurate initial centering and repeatability of centering are vital to to proper recording and reading on the disc. The accuracy is impaired if the magnetic force can cause the disc to be pulled to the spindle at the periphery before proper centering. One solution to this problem is a hub structure disclosed in U.S. Pat. No. 4,224,648 to Roling granted Sep. 23, 1980. The disc hub includes a centering element or ball, a peripheral collar, and a diaphragm between the element and collar which flexes to allow axial displacement of the collar relative to the centering ball. A cup in the spindle captures the ball whenever the hub is approximately centered on the spindle, and further guides the ball to the spindle center. After centering, the diaphragm flexes to allow the collar to move, in response to a magnet in the spindle, to a full seating against the spindle.

Such a hub, including the collar, diaphragm and a housing for the centering ball, is preferably an aluminum casting. The centering ball is then mounted into the casting and the armature, of a magnetizable material, is attached. To reduce cost, it is desirable to substitute a plastic for the aluminum casting. Not only is the material itself less expensive; post-casting machining operations, required for the aluminum die casting, can be eliminated using a more accurate plastic mold, which initially can form a hub nearer to the required tolerances.

Centering accuracy is diminished, however, when a plastic hub is substituted for an aluminum hub. The plastic, having a significantly lower elastic modulus, has proportionally less diaphragm stiffness in the radial direction to cause the collar to follow movement of the centering ball in spite of friction between the collar and spindle. The result is that in spite of the centering ball's centered position within the spindle cup, the armature and collar strain the diaphragm and become firmly planted off center on the spindle, causing the disc to be improperly centered. The result is a track run out of prerecorded signals on the disc proportional to the radial force in the diaphragm.

It is an object of the invention, therefore, to reduce the strain in the diaphragm and thereby maintain the geometry between the centering ball and collar. Another object of the invention is to reduce the frictional force between the hub and spindle as the hub is centered on the spindle. Yet another object of the invention is to produce a low cost hub capable of accurately centering a disc with respect to a drive spindle.

SUMMARY OF THE INVENTION

To achieve these and other objects, there is provided an apparatus for mounting a hub on a spindle. The apparatus includes a rotatable hub having a centering element at its center. An armature is mounted with respect to said hub and is moveable radially relative to the hub. The apparatus further includes a spindle rotatable on a central axis and means defining an armature-receiving surface integral with the spindle. A forcing means is provided for urging the armature toward a full seating against the armature-receiving surface. The spindle includes a receiving means for engaging the centering element whenever the hub is at least approximately centered on the spindle. The receiving means, once in contact with the centering element, guides it toward the central axis responsive to the forcing means. As the armature and hub are free to move radially with respect to one another, the receiving means guides the hub toward a centered position on the spindle independently of the armature.

Due to the floating armature, the friction between the armature and pole piece need not be overcome when centering the hub. This effectively reduces the weight of the hub (i.e., the force normal to the friction surfaces) and further permits the application of Teflon or a similar low friction coating in an area internally of the hub and not subject to scuffing and the like.

Yet another feature of the invention relates to the manner in which the disc is mounted to the hub. A clip is mounted at each of three locations concentric about the hub and equally spaced along the circumferential collar. Each clip has a base imbedded into the plastic hub as the clip is tightened thereto, and a cantilevered portioned which imbeds itself into the disc being attached to the hub, establishing virtually three-point contact between the hub and disc. This three-point contact establishes the plane of the disc in spite of possible warpage in other regions of the hub, and further avoids warpage in the disc itself.

In the Drawings

Other features and advantages of the invention will become apparent upon a reading of the following detailed description and upon reference to the drawings, in which:

FIG. 3 is a sectional view taken along the line 3—3 in FIG. 2, with the outer casing removed for greater clarity;

FIG. 4 is a sectional view taken along the line 4—4 in FIG. 3;

FIG. 5 is a sectional view taken along the line in the 5—5 in FIG. 4;

DETAILED DESCRIPTION OF THE PREFERRED EMBODIMENT

Figure 1:
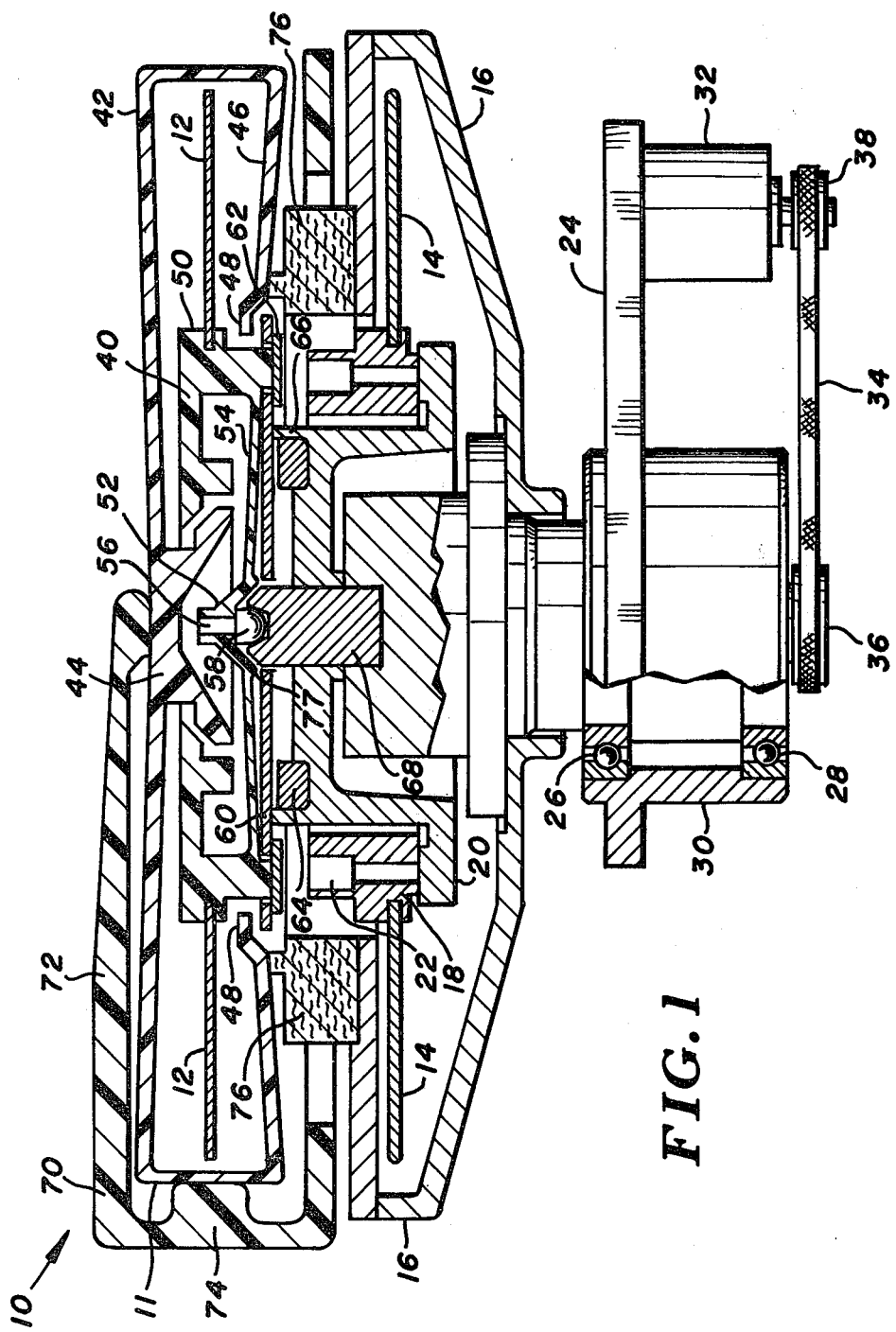
FIG. 1 is an elevational view of a disc drive apparatus according to the invention.
Figure 2:
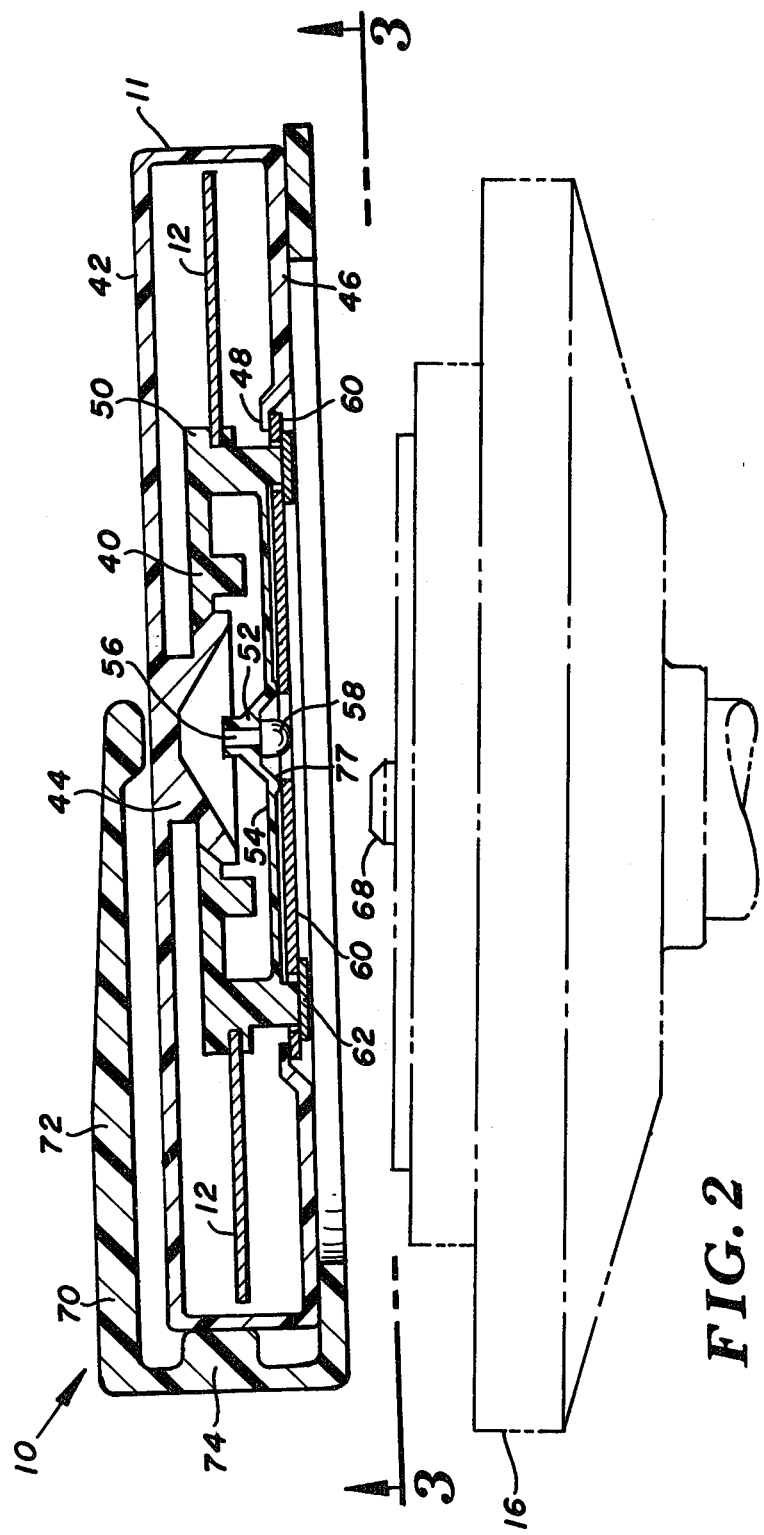
FIG. 2 is a view similar to that in FIG. 1 with the cartridge removed from the fixed disc.

Referring to the drawings, FIGS. 1 and 2 show a disc drive mechanism 10 including two magnetic discs: a removable disc 12, in a removable cartridge 11, and a fixed disc 14 permanently mounted with respect to the disc drive and contained in a fixed disc housing 16. Disc 14 is clamped to a fixed hub 18, which in turn is fastened to a drive spindle 20 by a plurality of module clamping bolts 22 which fix the position of the disc/hub module relative to spindle 20. The module and spindle are rotatable about a central axis with respect to a base 24. An upper bearing assembly 26 and a lower bearing assembly 28 mount the spindle with respect to a spindle arbor 30. A motor 32 rotates the spindle via a belt 34 which driveably associates a spindle pulley 36 and a motor pulley 38. By selectively operating motor 32, fixed disc 14 can be placed in any desired angular position while a read and record head is moved to the desired location radially on each disc. In this manner, a desired portion of the disc surface area can be reached for reading or recording.

Removable disc 12 is clamped to a cartridge hub 40. The cartridge disc/hub module is enclosed in a cartridge casing 42. A shoe 44 extends from the casing top wall axially (downwardly in FIG. 1) into hub 40. The bottom wall 46 of cartridge casing 42 extends radially inwardly to an annular lip 48.

Hub 40 includes an annular collar 50, a housing 52 and a diaphragm 54 linking the collar and housing. The collar, diaphragm and housing comprise a unitary molded plastic piece. Mounted in the housing at the center of the hub is a centering peg 56 directed axially with respect to hub 40. At the bottom of peg 56 and extending from housing 52 in the axial direction is a centering element or ball 58 having a hemispherical surface facing axially inward toward the spindle as viewed in FIG. 1. Mounted to hub 40 is an annular armature plate 60, constrained with respect to the hub in the axial direction by a plurality of armature restraints or thrust washers, one of which is shown at 62. Armature plate 60 is constructed of a magnetizable material.

For fixing cartridge hub 40 in a driving relationship with spindle 20, an annular permanent magnet 64 is mounted in the spindle. An armature-receiving surface is provided in the spindle by an annular pole piece 66 radially outwardly of magnet 64 and extending axially outward therefrom, so as to prevent the armature plate 60 from directly contacting the magnet. Magnet 64, by its attraction of armature plate 60, maintains the armature in full engagement against pole piece 66.

Formed in spindle 20 is a receiving means or centering cup 68, centered on the spindle drive axis and having a capture range sufficiently large such that whenever hub 40 is at least approximately centered on the spindle, cup 68 captures centering element 58 and guides the same to the spindle center.

Drive mechanism 10 further includes a cartridge guide 70 for aiding the manual insertion of removable cartridge 11. Guide 70 includes an arm 72 and a backstop 74 for controlling the extent of cartridge insertion. An annular air filter 76, positioned between fixed disc 14 and the removable cartridge, provides for the removal of dust particles and other foreign matter from the chambers surrounding discs 12 and 14.

In FIG. 2, cartridge 11 is shown free of the disc drive. Certain seals are provided for the protection of disc 12 from contamination when removed from the drive. For example, the inner rim of armature 60 is contacted by an annular sealing ring 77, the outer portion of armature 60 is in contact with annular lip 48 of the cartridge casing, and shoe 44 is in contact with hub 40. The seals in contact with armature plate 60 prevent the entry of dust into the cartridge when it is removed from the drive mechanism 10. The seal between lip 48 and armature 60 and between shoe 44 and hub 40 further prevent rotation of the disc and hub relative to the cartridge casing whenever the cartridge is removed from the drive. This stabilizes the module within cartridge 11 and thus prevents damage during storage.

Viewing FIGS. 1 and 2 together, it can be seen that insertion of the cartridge into the drive mechanism 10 causes a downward movement in cartridge guide arm 72 which forces shoe 44 downward as well, thereby freeing hub 40. The downward pressure from arms 72 also forces bottom wall 46 against filter 76, and causes an upward and radially inward flexing of the bottom wall, relative to the remainder of cartridge 40, after it contacts the filter. This flexing, as hub 40 moves downward toward spindle 20, breaks the seal between armature 60 and lip 48.

The remaining seal shown in FIG. 2 is that between armature plate 60 and sealing ring 77. With cartridge 11 free of drive 10, diaphragm 54 is substantially parallel to cartridge top and bottom walls. In fact, to improve the ring/armature seal, it has been found advantageous to form the plastic hub with a slight downward and radially inward bias in the diaphragm. To illustrate, upon removal of armature plate 60, the centering element and housing would assume a stress-free position axially inward (downward) from that shown in FIG. 2 having moved 0.011 inches relative to collar 50.

The ring/armature seal is broken as hub 40 is centered on spindle 20. In FIG. 1., the hub is fully mounted with centering element 58 fully cradled within cup 68 and armature plate 60 fully seated against pole piece 66. In this position also diaphragm 54 is flexed, but upward and radially inward rather than downward. The purpose of the flexure requirement is to insure that centering element 58 becomes fully seated in cup 68 before armature 60 can become fully seated against pole piece 66. This hub centering is explained in greater detail in U.S. Pat. No. 4,224,648, incorporated herein by reference. Flexure of diaphragm 54 occurs as soon as centering element 58 becomes seated in cup 68 and is thus prevented from following collar 50 and armature plate 60 as the latter is attracted by magnet 64. Sealing ring 77, near housing 52, is similarly prevented from following the collar and armature plate, whereupon the ring/armature seal is broken.

The above described centering method is quite effective when the hub employed is aluminum. A plastic hub is less effective in centering, since the plastic diaphragm lacks the stiffness in the radial direction necessary to move the collar (and disc) precisely with the centering element as it is centered on the spindle. In accordance with the invention, armature plate 60 is mounted so as to "float" with respect to hub 40, thereby permitting accurate centering of the hub on spindle 20. As seen in FIGS. 3 and 4, armature plate 60 is secured to hub 40 with three armature restraints: restraint 62, a second armature restraint 78 and a third armature restraint 80, fastened to hub 40 respectively by first, second and third armature retaining screws 82, 84 and 86. To receive the screws, first, second and third bosses 88, 90 and 92 are formed in collar 50, (see FIG. 5) each boss internally threaded for engagement with its associated retaining screw. The bosses and armature restraints are arranged symetrically on hub 40, i.e., spaced at 120 degree increments.

Armature plate 60 is flat and circular, having an opening at its center to accommodate centering element 58 and cup 68, and first, second and third peripheral openings 94, 96 and 98 spaced 120 degrees from one another. For mounting to hub 40, the armature plate is first generally centered on the hub with the peripheral openings and hub bosses aligned. Restraints 62, 78 and 80 are then fastened against the bosses with the retaining screws. Each restraint is larger in diameter than its associated peripheral opening, and thus armature 60 is secured axially with respect to the hub 40. However, each boss is substantially smaller in diameter than its associated peripheral opening. Consequently armature 60 is free to move relative to hub 40 in all directions perpendicular to the hub central axis. The armature, within the limits of boss and peripheral opening geometry, floats radially of the hub.

Mounted to hub 40 and substantially surrounding each boss, respectively are a first disc fastener or clip 100, a second fastener 102, and a third fastener 104, perhaps best seen in FIG. 5. Fastener 100 has a body 100A from which two legs, 100B and 100C, extend radially inward. A disc impinging module 100D protrudes axially outward from body 100A, while hub impinging nodules 100E and 100F protrude similarly from legs 100B and 100C which together form a hub contact surface in fastener 100. Screws 100G and 100H secure the legs to hub 40. Fasteners 102 and 104 are identical to fastener 100.

For its mounting to hub 40, disc 12 is placed in a substantially centered position on the hub with its inner rim adjacent a rim interface 106 of the hub and in contact with three cylindrical disc impinging studs, two of which are shown at 108 and 110. Fasteners 100, 102 and 104 are then positioned and secured to hub 40, e.g., fastener 100 via the tightening of screws 100G and 100H into hub collar 50. Such tightening brings legs 100B and 100C into full engagement with a landing 112 of hub 40, thereby embedding nodules 100E and 100F into the hub. Similarly, stud 108 and nodule 100D become embedded into disc 12. With all fasteners tightened, disc 12 is positioned on the hub at essentially three points or stud-nodule pairs spaced 120 degrees from each other. These points readily determine the plane of disc 12 and further avoid the possibility of disc warpage due to the relatively small contact area. Preferably, the gap between the disc and each stud and fastener body is filled with an epoxy resin.

While fasteners 100, 102 and 104 are flat when unstressed, it is seen from FIG. 4 that the body of each, e.g., body 100A of fastener 100, is bent and acts as a cantilever beam to maintain disc 12 against stud 108. The legs of fastener 100 are flush against landing 112. Consequently the clamping force of fastener 100 is entirely a function of the cantilever beam force in base 100A and is not influenced by the tightness of screws 100G and 100H. Hence the disc clamping force can be determined by fastener geometry and material rather than by the skill of those assembling the module.

As important feature of the invention resides in the angular alignment of the fastener, restraints and bosses. Mounting of each removable disc parallel with fixed disc 14 is essential, but the tendency in plastic hub 40 to ways, however slightly, jeopardizes such parallelism. In FIG. 1 it is seen that pole piece 66 locates armature plate 60 in a plane parallel to that of fixed disc 14. The location is sufficiently accurate as both the armature and pole piece are metal. At three angular positions, one of restraints 62, 78 and 80 locates its associated boss bottom surface with respect to the armature. Finally, also at three angular positions, one of fasteners 100, 102 and 104 locates disc 12 with respect to hub 40. With the fasteners, bosses and retainers aligned, disc 12 is then also located with respect to the bottom surface of each boss, and thus is located with respect to the armature plate. Any warpage in hub 40 between the three angular positions does not affect parallel alignment since diaphragm force maintains the restraints against armature plate 60.

Figure 6:
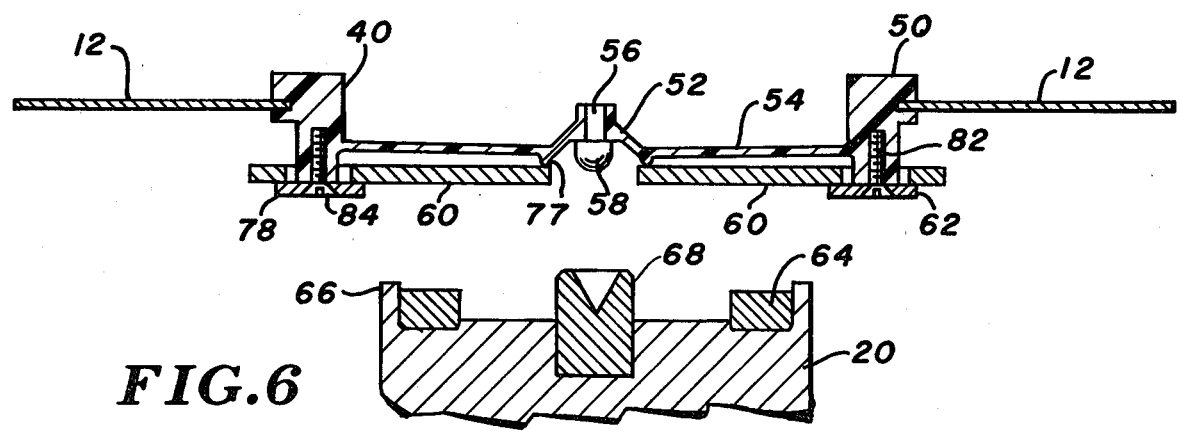
FIG. 6 is a diagrammatical view illustrating the hub and disc removed from the spindle.
Figure 7:
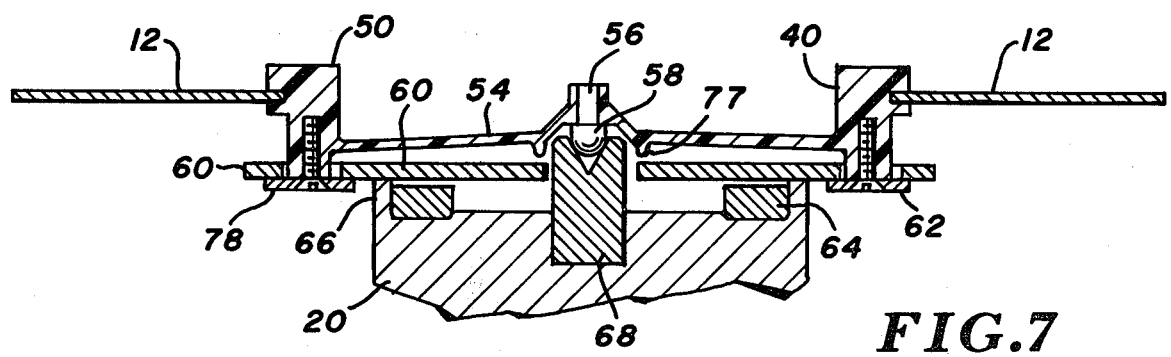
FIG. 7 is a view similar to that of FIG. 6 with the hub and removable disc operably positioned on the spindle.

FIGS. 6 and 7 illustrate in more detail the floating armature plate and its function during centering. In FIG. 6, armature plate 60 is positioned against an upper surface including the top surfaces of restraints 62, 78 and 80 radially outward of bosses 88, 90 and 92. The armature is held against the upper surface by lip 48 due to the bias in casing bottom wall 46 (FIG. 1), and to a lesser degree by a bias in the diaphragm from the previously mentioned 0.011 inch axial displacement of centering element 58 acting through sealing ring 77.

In FIG. 7, armature plate 60 is held against pole piece 66 by magnet 64, centering element 58 is cradled in cup 68, and diaphragm 54 has flexed an additional amount whereby the centering element is displaced axially a total of 0.031 inches. An off-center landing of armature plate 60 is shown in exaggerated form to illustrate centering of hub 40 independently of the armature's radial position. Freeing hub 40 from armature plate 60 reduces the frictional drag on collar 50 which otherwise would prevent the collar from radially following centering element 58 to the centered position on spindle 20. First of all it enables a reduction in the friction coefficient. With conventional armature mounting, drag occurs between the armature and pole piece over exposed surface areas subject to scuffing and the like. Drag between armature 60 and restraints 62, 78 and 80, however, occurs between the armature and the above described upper surface at surface areas not subject to scuffing or other external damage. Aside from remaining smoother, the latter surface areas effectively retain a low friction coating whereas such a coating would wear off an exposed surface. Application of such a coating to the upper surface has been found to reduce the friction coefficient to one-third its previous value. A further reduction in drag arises from reduced normal (axial) force since the hub is free of the armature. The normal force is proportional to the relatively low diaphragm load rather than the larger armature-magnet attraction. This factor has cut the drag in half, the combination of reduced force and reduced coefficient resulting in one-sixth of the frictional drag.

Thus, the apparatus disclosed is an effective, low cost removable disc. A plastic hub allows reduced cost manufacture, while two significant problems inherent in the plastic hub—the tendency to warp and a relatively low elastic modulus—are overcome, one by alignment of the disc mounting structure with the armature plate retaining structure, and the other by a radially floating mounting of the armature.

What is claimed is:

1. Apparatus for mounting a hub on a spindle, including:
    a rotatable hub including a circumference collar, a centering element at the hub center, and extend axially thereof, and a connecting means for maintaining said collar in a normal position with respect to said centering element;

an armature plate mounted with respect to the collar constrained against any substantial axial movement relative thereto;

a spindle rotatable on a central axis, and means defining an armature plate-receiving surface integral with said spindle;

a forcing means for urging said armature plate axially inward toward a full engagement against said armature plate-receiving surface;

said spindle including a receiving means for engaging said centering element whenever said hub is at least approximately centered on said spindle and for guiding said element, when in contact therewith, toward said central axis responsive to said forcing means said connecting means being substantially rigid radially of said hub, but deformable elastically to allow axial displacement of said collar from said normal position with respect to said centering element;

whereby said collar and said armature plate, with said centering element and said receiving means in contact are displaced responsive to said forcing means axially inward from said normal position, thereby elastically deforming said connecting means prior to said full seating of said armature plate against said armature plate-receiving surface;

wherein said collar is movable radially of said armature plate so as to allow said hub to move radially independently of said armature plate toward a centered position on said spindle as said centering element is guided toward said central axis thereby to reduce the radial stiffness in said connecting means required for hub centering.

2. The apparatus of claim 1 including:

means for limiting the movement of said armature radially of said hub.

3. The apparatus of claim 2 wherein:

said means for limiting movement of said armature include a plurality of bosses formed in said hub, and means defining openings in said armature, each opening associated with one of said bosses and larger in diameter than its associated boss.

4. The apparatus of claim 1 wherein: said forcing means includes a permanent magnet attached to said spindle, and said armature is of a magnetizable material.

5. For centering a magnetic disc on a spindle in a magnetic disc reading and recording device, apparatus including:

a spindle, means defining an armature plate-receiving surface integral with said spindle, and means for driving said spindle rotatably about a central axis; a rotatable hub adapted for carrying at least one magnetic disc said hub including a circumferential collar, a centering element at the hub center and extending axially thereof and a connecting means for maintaining said collar in a normal position with respect to said centering element; an armature plate mounted to the collar and constrained against any substantial axial movement relative thereto; and a forcing means for urging said armature plate axially inward toward a full engagement against said armature plate-receiving surface; said spindle including a receiving means for engaging said centering element whenever said hub is at least approximately centered on said spindle, and for guiding said element, when in contact therewith, toward said central axis responsive to said forcing means;

said connecting means being substantially rigid radially of said hub, but deformable elastically to allow axial displacement of said collar from said normal position with respect to said centering element;

whereby said collar and said armature plate, with said centering element and said receiving means in contact are displaced responsive to said forcing means axially inward from said normal position, thereby elastically deforming said connecting means prior to said full seating of said armature plate against said armature plate-receiving surface;

wherein said collar is movable radially of said armature plate so as to allow said hub to move radially independently of said armature plate toward a centered position on said spindle as said centering element is guided toward said central axis thereby to reduce the radial stiffness in said connecting means required for hub centering.

* * * * *